United States Patent
Price et al.

(10) Patent No.: US 7,249,365 B1
(45) Date of Patent: Jul. 24, 2007

(54) SYSTEM AND METHOD FOR ENSURING PRESENTATION OF EMBEDDED RICH MEDIA ACROSS STATION BOUNDARIES

(75) Inventors: William Pat Price, Santa Ana, CA (US); R. Gregory Kalsow, Lake Forest, CA (US)

(73) Assignee: Keen Personal Media, Inc., Lake Forest, CA (US)

(*) Notice: Subject to any disclaimer, the term of this patent is extended or adjusted under 35 U.S.C. 154(b) by 572 days.

(21) Appl. No.: 10/066,207

(22) Filed: Jan. 31, 2002

(51) Int. Cl.
*H04H 9/00* (2006.01)
*H04N 7/10* (2006.01)

(52) U.S. Cl. .......................... 725/9; 725/32
(58) Field of Classification Search ............. 725/9, 725/17, 32, 34, 35, 36, 37, 42, 1, 14; 705/1, 705/14, 500, 27; 348/729, 731
See application file for complete search history.

(56) References Cited

U.S. PATENT DOCUMENTS

| | | | | |
|---|---|---|---|---|
| 5,652,615 A * | 7/1997 | Bryant et al. | ................. | 725/35 |
| 5,774,170 A | 6/1998 | Hite et al. | | |
| 5,805,974 A | 9/1998 | Hite et al. | | |
| 6,002,393 A | 12/1999 | Hite et al. | | |
| 2002/0032698 A1* | 3/2002 | Cox | ........................ | 707/501.1 |
| 2002/0056109 A1* | 5/2002 | Tomsen | ........................ | 725/60 |
| 2002/0083439 A1* | 6/2002 | Eldering | ........................ | 725/32 |
| 2002/0087973 A1* | 7/2002 | Hamilton et al. | ............. | 725/32 |
| 2002/0144262 A1* | 10/2002 | Plotnick et al. | ................. | 725/32 |
| 2003/0037332 A1* | 2/2003 | Chapin et al. | ................. | 725/35 |
| 2003/0066078 A1* | 4/2003 | Bjorgan et al. | ............... | 725/34 |

FOREIGN PATENT DOCUMENTS

WO    WO 98/08340    *    2/1998

* cited by examiner

*Primary Examiner*—Igor N. Borissov
(74) *Attorney, Agent, or Firm*—Howard H. Sheerin, Esq.

(57) ABSTRACT

A presentation device, such as a personal video recorder or a digital audio receiver, and a method for saving alternative presentation data for possible future presentation. According to the method, a broadcast stream is received on a selected channel. The broadcast stream includes a plurality of programming media segments and at least one rich media segment associated with the alternative presentation data. The at least one rich media segment and the associated alternative presentation data are embedded within the plurality of programming media segments. Presentation of the at least one rich media segment commences on the selected channel. If presenting the at least one rich media segment on the selected channel is interrupted prior to completely presenting the at least one rich media segment on the selected channel, the alternative presentation data associated with the at least one rich media segment is saved for possible future presentation.

28 Claims, 2 Drawing Sheets

SYSTEM AND METHOD FOR ENSURING PRESENTATION OF EMBEDDED RICH MEDIA ACROSS STATION BOUNDARIES

BACKGROUND OF THE INVENTION

1. Field of the Invention

The invention generally relates to presenting data, and more particularly, the invention relates to a system and method for ensuring presentation of embedded rich media.

2. Description of the Prior Art

A digital video recorder (DVR), like a conventional analog video cassette recorder (VCR), is coupled to a monitor or a television set in a viewer's home and receives program broadcast signals via a coaxial cable, a satellite dish, or an antenna for terrestrial radio frequency (RF) signals. In some instances, the DVR may include a modem that permits access to content from the Internet. In order to record a particular program, the video recorder starts and stops recording the program at a predetermined day and time.

A DVR allows a viewer the ability to time shift in order to overcome the rigid time scheme according to which the programs are broadcast. That is, a viewer can decide whether to watch "live TV" or to record a program and watch it later at a more convenient day and time. Alternative systems provide for even more flexibility and viewer-specific television. For example, digital video recorders offered by Replay Networks® of Palo Alto, Calif. (in combination with ReplayTV™ service) and Philips® of Eindhoven Netherlands (in combination with TiVo® service of Sunnyvale, Calif.) include a hard disk drive for storing program content. These digital video recorders, also referred to as personal video recorders (PVRs), and the respective services allow the viewer to personalize their television viewing experience. For instance, personal video recorders can learn a viewer's preference or taste for programs and automatically record programs that it expects a viewer to like, based on a recommendation device (or software). The viewer can also, among other activities, watch and pause live TV (known in the industry as "trick play"). That is, the viewer can operate a remote control to pause a broadcast of a favorite show (for example, when someone calls), and resume the show again, exactly where the viewer left the program.

Broadcasting companies are dependent on advertising revenues. Therefore, it is a goal of these companies to ensure the widest audience possible for receiving advertising broadcasts. When viewing television or listening to radio, users have a tendency to change channels (i.e., "channel surf") when an advertisement is played on the current channel. One method of solving this problem is disclosed in U.S. Pat. No. 5,805,974 entitled Method and Apparatus for Synchronizing Commercial Advertisements Across Multiple Communication Channels. This patent solves this problem by playing the same commercial at the same time on as many channels as possible. This is a costly process and requires a great deal of coordination among the owners/operators of the various channels/stations.

There is therefore a need for ensuring presentation of data, such as an advertisement, in the event of an interruption, such as a channel change.

SUMMARY OF THE INVENTION

An aspect of the present invention may be regarded as a method for saving alternative presentation data. A broadcast stream is received on a selected channel. The broadcast stream includes a plurality of programming media segments and at least one rich media segment associated with the alternative presentation data. The at least one rich media segment and the associated alternative presentation data are embedded within the plurality of programming media segments. Presentation of the at least one rich media segment commences on the selected channel. If presenting the at least one rich media segment on the selected channel is interrupted prior to completely presenting the at least one rich media segment on the selected channel, the alternative presentation data associated with the at least one rich media segment is saved.

The at least one rich media segment may be interrupted if a user changes from the selected channel to a different channel. The at least one rich media segment may be an advertisement. The alternative presentation data may be stored as metadata. The alternative presentation data may be the same as the at least one rich media segment or the alternative presentation data may be different than the at least one rich media segment. The saved alternative presentation data may be presented. The alternative presentation data may be presented simultaneously with presenting of at least one of the programming media segments of the broadcast stream. The alternative presentation data may be presented on the selected channel. The alternative presentation data may presented for a time period that is equivalent to the difference between the initial length of time for presentation of the at least one rich media segment and the length of time that the at least one rich media segment has previously been presented. Tracking information for the presentation of the alternative presentation data may be stored and/or transmitted for storage in a database. Tracking information for the presentation of the at least one rich media segment may be stored and/or transmitted for storage in a database. Tracking information for the interruption of the presentation of the at least one rich media segment may be stored and/or transmitted for storage in a database. An expiration time may be stored with the alternative presentation data. The alternative presentation data may be discarded if the alternative presentation data is not presented prior to the expiration time. The alternative presentation data may be stored on a hard disk drive. The at least one rich media segment may include video data and/or audio data.

Another aspect of the present invention may be regarded as a personal video recorder for saving alternative presentation data associated with a rich media segment included in a broadcast stream when viewing of the rich media segment on a display is interrupted. The personal video recorder includes: a viewer control interface configured to allow the viewer to interrupt the viewing of the rich media segment; a storage device for storing the alternative presentation data in response to the viewer interrupting the viewing of the rich media segment; and a controller responsive to the viewer control interface and connectable to the display. The controller is configured to receive signals indicating the interruption of the rich media segment and to store the alternative presentation data associated with the rich media segment on the storage device when a signal is received from the viewer control interface indicating the interruption of the rich media segment.

The storage device may be a hard disk drive. A channel change may generate the signal indicating the interruption of the rich media segment. A tuner change may generate the signal indicating the interruption of the rich media segment.

Another aspect of the present invention may be regarded as a digital audio receiver for saving alternative presentation data associated with a rich media segment included in a broadcast stream when playing of the rich media segment on an audio output device is interrupted. The digital audio receiver includes: a listener control interface configured to allow the listener to interrupt the playing of the rich media segment; a storage device for storing the alternative presentation data in response to the listener interrupting the playing of the rich media segment; and a controller responsive to the listener control interface and connectable to the audio output device, the controller configured to receive signals indicating the interruption of the rich media segment and to store the alternative rich media segment associated with the rich media segment on the storage device when a signal is received from the listener control interface indicating the interruption of the plying of the rich media segment.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF THE PREFERRED EMBODIMENTS

The present invention includes a system and a method for ensuring presentation of embedded rich media across station boundaries. The rich media may include audio data and/or video data. The rich media data is embedded in programming media segments. The programing media segments form a program, such as a television, cable or radio broadcast program, which is included in a broadcast stream. Intermixed or embedded within the programing segments is a rich media segment. The rich media segment may include audio and/or video data. The embedded rich media segment may be, for example, a commercial that is to be presented during the broadcast program. The embedded rich media may include alternative presentation data. The alternative presentation data is information that may be presented if the presentation of the embedded rich media is interrupted. For example, if the presentation of the rich media is interrupted, for example, via a channel change or a tuner change, the alternative presentation data is saved and may be presented at a future time. The alternative presentation data may be in the same format as the embedded rich media. For example, the alternative presentation data may be a shorter version of the embedded rich media. For example, the embedded rich media may be a 30-second advertisement, and the alternative presentation data may be a commercial including 15-seconds of data excerpted from the 30-second commercial. Alternatively, the alternative presentation data may be identical to the embedded rich media. The alternative presentation data may also be entirely different than the embedded rich media. For example, the embedded rich media may be a 30-second commercial advertisement and the alternative presentation data may be a banner advertisement, for example, a textual display providing the name, address and telephone number of the advertiser. Such an advertisement may be presented in conjunction with the broadcast program, for example, by displaying the banner advertisement across the bottom of a display.

Figure 1:
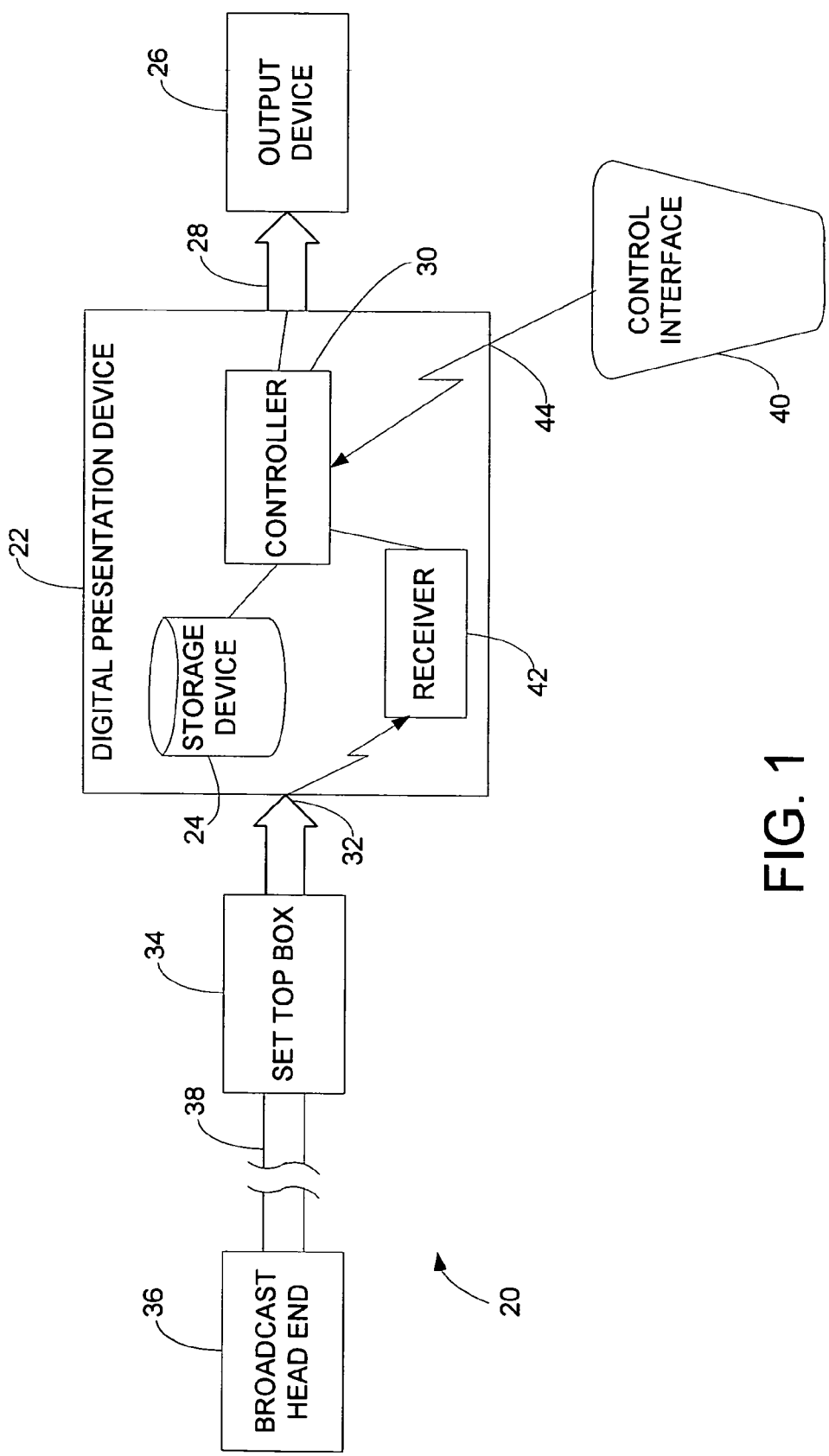
FIG. 1 shows a system for ensuring presentation of embedded rich visual media across station boundaries formed in accordance with the present invention.

Referring now to the drawings wherein the showings are for purposes of illustrating preferred embodiments of the present invention only, and not for purposes of limiting the same, FIG. 1 shows an embodiment of a system 20 for presenting a broadcast stream, such as streaming video and/or audio data in accordance with the present invention. The data may be Moving Picture Experts Group (MPEG) data, for example. The system 20 includes a digital presentation device 22. In one embodiment of the invention, the digital presentation device 22 is a personal video recorder (PVR). The digital presentation device 22 is connected through a data line 28 to an output device 26, a set top box 34 connected to a port 32 of the digital presentation device 22, a broadcast head end 36 connected through a communication means 38, such as a cable or a satellite downlink to the digital presentation device 22, and a control interface 40, such as a remote control or buttons, knobs or dials which may be located on the digital presentation device 22 and/or the set top box 34. If the digital presentation device 22 is a PVR, the output device 26 is a display. In the embodiment shown in FIG. 1, the digital presentation device 22 includes a receiver 42. The receiver 42 may be a satellite receiver. The receiver 42 may be capable of receiving multiple program streams simultaneously.

The digital presentation device 22 also includes a controller 30. The controller 30 receives signals from the control interface 40 indicating user interactions with the control interface 40.

The digital presentation device 22 also includes a storage device 24. The storage device 24 stores alternative presentation data for future presentation via the output device 26. In exemplary embodiments of the invention, the storage device 24 is a hard disk drive, such as is manufactured by Western Digital Technologies Inc. of Lake Forest, Calif.

It will be appreciated that the system 20 of the present invention may include configurations other than the one illustrated in FIG. 1. For example, the digital presentation device 22 and set top box 34 may be integrated into a single device rather than two separate devices. The system 20 may also include a modem (not shown) connected to the set top box 34 or the digital presentation device 22. The modem may be an internal or external modem connected to a public switched telephone network (PSTN) or to a (coaxial) cable. In the latter case, the modem is referred to as a cable modem.

The present invention may also be used for the presentation of audio information, for example, the system may be used for the presentation of audio information on an XM satellite radio station. For example, the system 20 may be an audio system having a digital presentation device 22 that is a digital audio receiver that receives audio signals from a broadcast head end 36. The digital audio receiver outputs the audio signal via an output device 26, such as a speaker.

Figure 2:
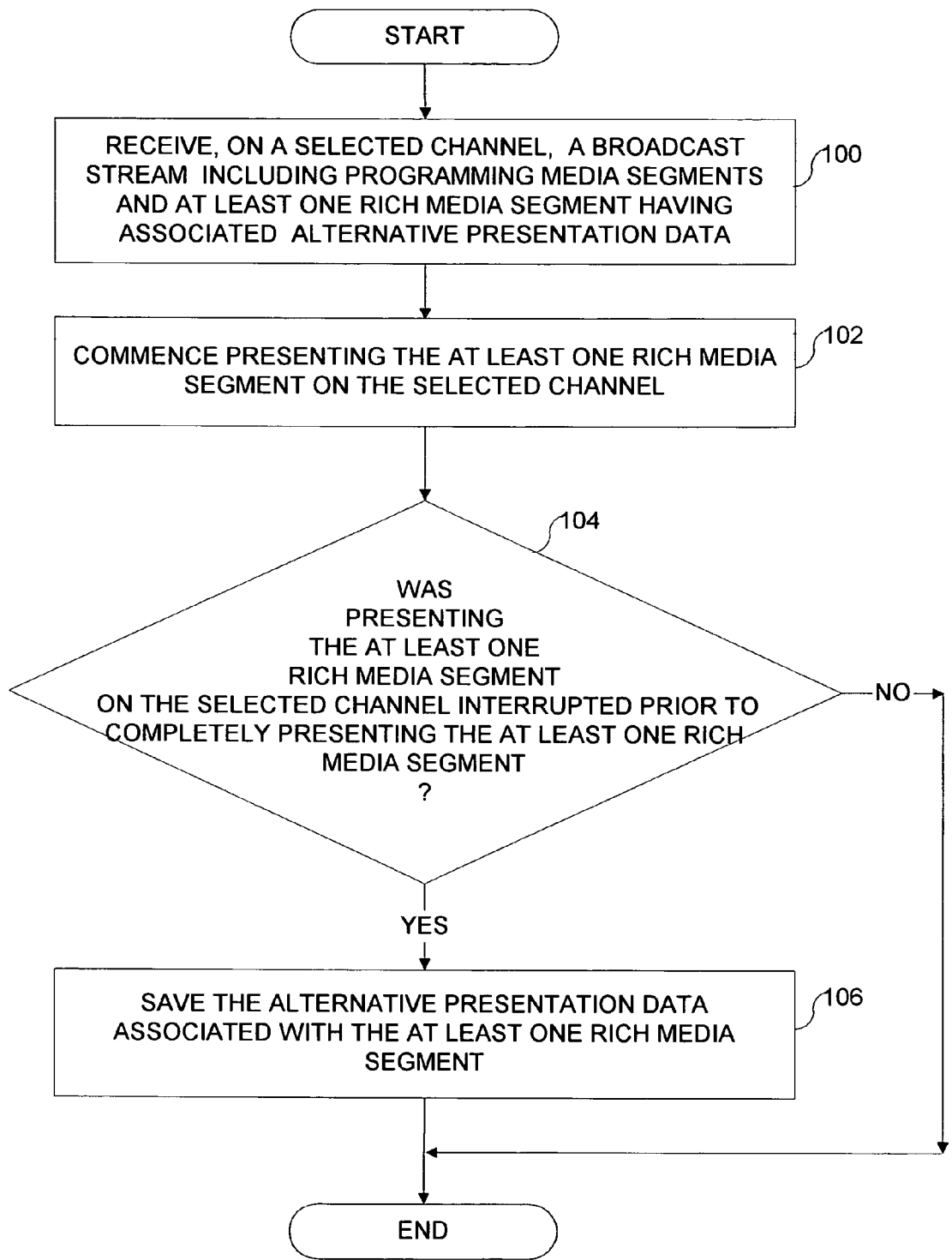
FIG. 2 is a flow chart illustrating exemplary logic for ensuring presentation of embedded rich media across station boundaries in accordance with the present invention.

FIG. 2 is a flow diagram illustrating exemplary logic of a method for saving alternative presentation data. The logic of FIG. 2 moves from a start block to block 100 where a broadcast stream is received on a selected channel. As described above, the broadcast stream may be MPEG data which may include audio data and/or video data. The broadcast stream includes a plurality of programming media segments. The broadcast stream also includes at least one rich media segment embedded within the programming media segments. For example, the rich media segment may be an advertisement and the programming media segments may be a television program during which the advertisement is scheduled to be presented. The rich media segment includes associated alternative presentation data. The alternative presentation data can take many forms. For example, an advertisement may have alternative presentation data that is a shorter version of the advertisement. The alternative presentation data may also be a banner advertisement that can be displayed simultaneously with programming media segments. Alternatively, the alternative presentation data may be exactly the same as the rich media segment.

The logic proceeds to block 102 where presenting of the at least one rich media segment on a selected channel commences. If presenting of the at least one rich media segment is interrupted prior to completely presenting the at least one rich media segment (yes in decision block 104), the alternative presentation data associated with the at least one rich media segment is saved for future presentation (block 106). The presenting of the rich media segment may be interrupted if a channel or tuner is changed or if the presentation device is turned off. The logic of FIG. 2 then ends.

The saved alternative presentation data can be displayed at a later time. In various embodiments, the alternative presentation data may be capable of being presented simultaneously with the current broadcast stream. For example, the alternative presentation data may be a banner advertisement that is displayed at the bottom of a display. If the alternative presentation data is the same as the original media data, the alternative presentation data may display in its entirety. Alternatively, the alternative presentation data stored may be the original rich media data from the point that the presenting of the original rich media data was interrupted. In exemplary embodiments, the alternative presentation data may be displayed when the user returns to the selected channel. For example, the alternative presentation data may be presented immediately or shortly after returning to the selected channel. In alternative embodiments, the alternative presentation data may be displayed on a channel other than the selected channel.

In addition to presentation information, the alternative presentation data may include an expiration time. If the alternative data is not presented prior to the expiration time, the alternative presentation data is discarded. For example, the rich media segment data may relate to a time sensitive event, for example a sale. The alternative presentation data may include an expiration date/time so that the alternative presentation data is not presented after the date of the sale.

The present invention may also include tracking information. For example, tracking information may include: (1) tracking of the presentation of the rich media data; (2) tracking of the interruption of the rich media data; and/or tracking of the presentation, if any, of the alternative presentation data. The tracking information is stored. The tracking information may be transmitted, for example, for storage at an external, central location. The tracking information can be analyzed. For example, this information may be provided to advertisers so that the advertisers can make decisions regarding the use of alternative presentation data in conjunction with their advertisements.

In exemplary embodiments, the digital presentation device 22 receives metadata which may include information about the rich media data, for example, a pointer to a broadcast stream including a advertising display data. The metadata may also include instructions on the alternate presentation data, if any, to be displayed in the event that the presentation of the rich media data is interrupted. For example, the metadata may include a time period which a channel must be tuned to prior to displaying the alternative presentation data so that the presentation of the alternative presentation data is not missed due to channel surfing. The metadata may also include instructions for displaying the alternative presentation data, for example, the instructions may be to continue displaying the original rich media data from the point that the presentation was interrupted after a channel has been displayed for a specified period of time. If the presentation is interrupted again, the instructions may include information for a banner advertisement and a period of time for displaying the banner advertisement.

What is claimed is:

1. A method for saving alternative presentation data, the method comprising:
   a. receiving a broadcast stream on a selected channel, the broadcast stream comprising a plurality of programming media segments and at least one rich media segment associated with the alternative presentation data, the at least one rich media segment and the associated alternative presentation data being embedded within the plurality of programming media segments;
   b. commencing presenting the at least one rich media segment on the selected channel;
   c. saving the alternative presentation data associated with the at least one rich media segment is presenting the at least one rich media segment on the selected channel is interrupted prior to completely presenting the at least one rich media segment on the selected channel; and
   d. presenting the saved alternative presentation data associated with the rich media segment for a time period equivalent to an initial length of time for a presentation of the at least one rich media segment less a length of time that the at least one rich media segment has previously been presented.

2. The method of claim 1, wherein presenting the alternative presentation data occurs simultaneously with presenting of at least one of the programming media segments of the broadcast stream.

3. The method of claim 1, wherein the alternative presentation data is presented on the selected channel.

4. The method of claim 1, further comprising storing tracking information for the presenting of the alternative presentation data.

5. The method of claim 4, further comprising transmitting the tracking information for the presenting of the alternative presentation data for storage in a database.

6. The method of claim 1, wherein the alternative presentation data is stored as metadata.

7. The method of claim 1, further comprising storing tracking information for the presenting of the at least one rich media segment.

8. The method of claim 7, further comprising transmitting the tracking information for the presenting of the at least one rich media segment for storage in a database.

9. The method of claim 1, further comprising storing tracking information for the interruption of presenting of the at least one rich media segment.

10. The method of claim 9, further comprising transmitting the tracking information for the interruption of presenting of the at least one rich media segment for storage in a database.

11. The method of claim 1, wherein the alternative presentation data is the same as the at least one rich media segment.

12. The method of claim 1, wherein the alternative presentation data is different than the at least one rich media segment.

13. The method of claim 1, wherein the at least one rich media segment is an advertisement.

14. The method of claim 1, wherein an expiration time is stored with the alternative presentation data, and wherein the alternative presentation data is discarded if the alternative presentation data is not presented prior to the expiration time.

15. The method of claim 1, wherein the alternative presentation data is stored on a hard disk drive.

16. The method of claim 1, wherein presenting of the at least one rich media segment is interrupted if a user changes from the selected channel to a different channel.

17. The method of claim 1, wherein the at least one rich media segment comprises video data.

18. The method of claim 1, wherein the at least one rich media segment comprises audio data.

19. A personal video recorder for saving alternative presentation data associated with a rich media segment included in a broadcast stream when viewing of the rich media segment on a display is interrupted, the personal video recorder comprising:
- a viewer control interface configured to allow the viewer to interrupt the viewing of the rich media segment;
- a storage device for storing the alternative presentation data in response to the viewer interrupting the viewing of the rich media segment; and
- a controller responsive to the viewer control interface and connectable to the display, the controller configured to receive signals indicating the interruption of the rich media segment, to store the alternative presentation data associated with the rich media segment on the storage device when a signal is received from the viewer control interface indicating the interruption of the rich media segment and to present the saved alternative presentation data that is associated with the rich media segment for a time period equivalent to an initial length of time for a presentation of the at least one rich media segment less a length of time that the at least one rich media segment has previously been presented.

20. The personal video recorder of claim 19, wherein the storage device is a hard disk drive.

21. The personal video recorder of claim 19, wherein a channel change generates the signal indicating the interruption of the rich media segment.

22. The personal video recorder of claim 19, wherein a tuner change generates the signal indicating the interruption of the rich media segment.

23. The personal video recorder of claim 19, wherein the rich media segment is an advertisement.

24. A digital audio receiver for saving alternative presentation data associated with a rich media segment included in a broadcast stream when playing of the rich media segment on an audio output device is interrupted, the digital audio receiver comprising:
- a listener control interface configured to allow the listener to interrupt the playing of the rich media segment;
- a storage device for storing the alternative presentation data in response to the listener interrupting the playing of the rich media segment; and
- a controller responsive to the listener control interface and connectable to the audio output device, the controller configured to receive signals indicating the interruption of the rich media segment, to store the alternative rich media segment associated with the rich media segment on the storage device when a signal is received from the listener control interface indicating the interruption of the playing of the rich media segment and to present the saved alternative presentation data that is associated with the rich media segment for a time period equivalent to an initial length of time for a presentation of the at least one rich media segment less a length of time that the at least one rich media segment has previously been presented.

25. The digital audio receiver of claim 24, wherein the storage device is a hard disk drive.

26. The digital audio receiver of claim 24, wherein a channel change generates the signal indicating the interruption of the rich media segment.

27. The digital audio receiver of claim 24, wherein a tuner change generates the signal indicating the interruption of the rich media segment.

28. The digital audio receiver of claim 24, wherein the rich media segment is an advertisement.

* * * * *

UNITED STATES PATENT AND TRADEMARK OFFICE
CERTIFICATE OF CORRECTION

PATENT NO.        : 7,249,365 B1                                                Page 1 of 1
APPLICATION NO.   : 10/066207
DATED             : July 24, 2007
INVENTOR(S)       : Price et al.

It is certified that error appears in the above-identified patent and that said Letters Patent is hereby corrected as shown below:

In the Claims:

Column 6, Claim 1, line 24: Please delete "is presenting" and insert -- if presenting --.

Signed and Sealed this

Twenty-third Day of March, 2010

David J. Kappos
*Director of the United States Patent and Trademark Office*